(12) United States Patent
Shin et al.

(10) Patent No.: US 11,714,462 B2
(45) Date of Patent: Aug. 1, 2023

(54) ELECTRONIC DEVICE

(71) Applicant: LG ELECTRONICS INC., Seoul (KR)

(72) Inventors: Donghyok Shin, Seoul (KR); Dongjoon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/553,552

(22) Filed: Dec. 16, 2021

(65) Prior Publication Data

US 2022/0197348 A1    Jun. 23, 2022

(30) Foreign Application Priority Data

Dec. 17, 2020  (KR) .......................... 10-2020-0177590

(51) Int. Cl.
| | |
|---|---|
| *G06F 1/16* | (2006.01) |
| *E05D 11/00* | (2006.01) |
| *F16C 11/04* | (2006.01) |
| *E05D 3/02* | (2006.01) |

(52) U.S. Cl.
CPC .......... *G06F 1/1681* (2013.01); *F16C 11/045* (2013.01); *E05D 3/02* (2013.01); *E05D 11/00* (2013.01); *E05Y 2201/638* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,053,589 A | * | 4/2000 | Lin ........................ | G06F 1/1616 312/271 |
| 7,926,781 B2 | * | 4/2011 | Wang .................... | G06F 1/1616 248/688 |
| 7,950,611 B2 | * | 5/2011 | Tracy ...................... | G06F 1/203 248/455 |
| 9,030,820 B2 | * | 5/2015 | Guo ....................... | G06F 1/1637 361/679.59 |
| 9,047,058 B2 | * | 6/2015 | Yu ......................... | G06F 1/1679 |
| 9,377,820 B2 | * | 6/2016 | Fu .......................... | G06F 1/1616 |

(Continued)

OTHER PUBLICATIONS

European Patent Office Application Serial No. 21214987.6, Search Report dated Apr. 29, 2022, 8 pages.

*Primary Examiner* — Lisa Lea-Edmonds
(74) *Attorney, Agent, or Firm* — Lee Hong Degerman Kang Waimey

(57) ABSTRACT

An electronic device is disclosed. The electronic device may include: a body provided with a computing system; a hinge assembly adjacent to one side of the body and installed inside of the body; and a display part including a display panel for displaying a screen, wherein the display part is pivotable with respect to the body and is connected to the hinge assembly, wherein the hinge assembly may include: a hinge shaft; a first coupling part adjacent to one end of the hinge shaft, extended from an outer circumferential surface of the hinge shaft, and fixed to the display part; a second coupling part rotatably coupled to the hinge shaft and that is fixed to the body; and a foot plate pivotably coupled to the second coupling part and pivotable with the second coupling part according to the rotation of the hinge shaft.

16 Claims, 9 Drawing Sheets

(56) References Cited

U.S. PATENT DOCUMENTS

| | | | | |
|---|---|---|---|---|
| 9,696,764 B2* | 7/2017 | Wolff | .................... | G06F 1/1681 |
| 9,983,638 B2* | 5/2018 | Chen | .................... | G06F 1/1616 |
| 10,503,214 B2* | 12/2019 | Jiang | .................... | G06F 1/1681 |
| 10,520,990 B2* | 12/2019 | Chen | .................... | G06F 1/1656 |
| 10,642,309 B2* | 5/2020 | Cheng | .................... | E05D 7/00 |
| 11,169,575 B2* | 11/2021 | Elsey | .................... | G06F 1/1681 |
| 2004/0264118 A1* | 12/2004 | Karidis | ................ | G06F 1/1616 |
| | | | | 361/679.55 |
| 2013/0107465 A1 | 5/2013 | Huang et al. | | |
| 2013/0249360 A1* | 9/2013 | Guo | .................... | G06F 1/1681 |
| | | | | 312/223.2 |
| 2019/0212773 A1* | 7/2019 | Jiang | .................... | G06F 1/1681 |
| 2020/0319670 A1* | 10/2020 | Elsey | .................... | G06F 1/1681 |
| 2021/0089077 A1* | 3/2021 | Wang | .................... | G06F 1/3287 |
| 2022/0197348 A1* | 6/2022 | Shin | ........................ | G06F 1/166 |

\* cited by examiner

ELECTRONIC DEVICE

CROSS REFERENCE TO RELATED APPLICATION

Pursuant to 35 U.S.C. § 119(a), this application claims the benefit of earlier filing date and right of priority to Korean Patent Application No. 10-2020-0177590, filed on Dec. 17, 2020, the contents of which are hereby incorporated by reference herein in its entirety.

BACKGROUND OF THE DISCLOSURE

Field of the Disclosure

The present disclosure relates to an electronic device provided with an up-down supporter hinge mechanism.

Related Art

With the diversified functions of electronic devices such as a TV, a personal computer, a notebook, a mobile phone, and a tab book, the electronic devices are implemented in a multimedia player form which is provided with multiple functions including a photograph of an image or video image, a playback of a music or video image file, a reception of broadcasting, and the like.

Recently, an electronic device provided with a large screen display has been developed to provide various types of information and improve an immersive screen experience of a user. Further, many structures have been researched to implement a large screen display on a mobile electronic device.

SUMMARY

An object of the present disclosure is to solve the problem described above or another problem. Another object of the present disclosure is to provide a hinge structure of an electronic device provided with a large screen display.

Still another object of the present disclosure is to provide an electronic device provided with a hinge structure to improve an immersive screen experience of a user.

Still another object of the present disclosure is to provide an electronic device provided with a hinge mechanism which is capable of an up-down drive.

In accordance with an aspect of the present disclosure, an electronic device may include: a body provided with a computing system; a hinge assembly adjacent to one side of the body and installed inside of the body; and a display part including a display panel for displaying a screen, wherein the display part is pivotable with respect to the body and is connected to the hinge assembly, wherein the hinge assembly may include: a hinge shaft; a first coupling part adjacent to one end of the hinge shaft, extending from an outer circumferential surface of the hinge shaft, and fixed to the display part; a second coupling part rotatably coupled to the hinge shaft and that is fixed to the body; and a foot plate that is pivotably coupled to the second coupling part and pivotable with the second coupling part according to the rotation of the hinge shaft.

The additional scope of the applicability of the present disclosure can be apparent from the detailed description below. However, since various modifications and alterations of the present disclosure can be clearly understood by those skilled in the art in the inventive concept and scope of the present disclosure, it is understood that the detailed description and a specific embodiment such as the preferred embodiment of the present disclosure are given just as examples.

DESCRIPTION OF EXEMPLARY EMBODIMENTS

Figure 1:
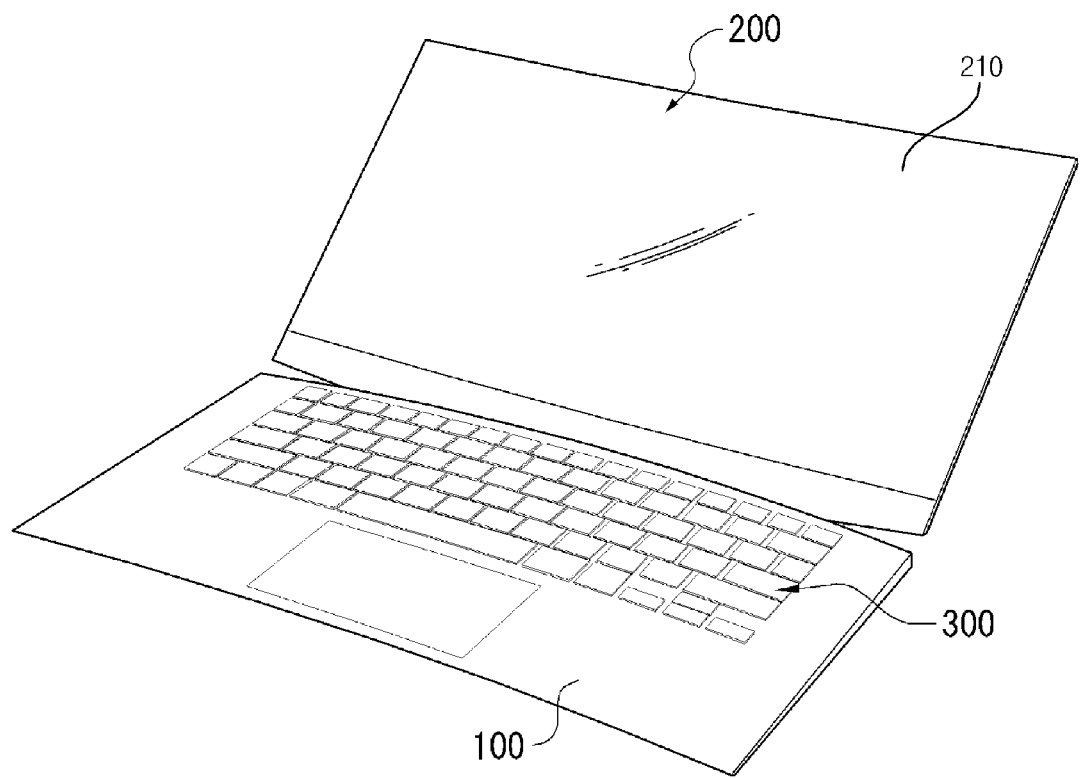
FIGS. 1 to 9 are diagrams illustrating examples of the electronic device according to an embodiment of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted.

A suffix "module" or "unit" used for constituent elements disclosed in the following description is merely intended for easy description of the specification, and the suffix itself does not give any special meaning or function.

In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it is understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element does not exist therebetween.

A singular representation may include a plural representation unless the representation represents a different meaning from the context.

Hereinafter, an Organic Light Emitting Display (OLED) panel is described for the display panel as an example, but the display panel applicable to the present disclosure is not limited to the OLED panel.

Referring to FIG. 1, a display device 200 may also be referred to as a display 200, a display unit 200, or a display part 200. An input device 300 may also be referred to as an input means 300, an input part 300, or an input unit 300. The display 200 may be hinge-connected to a body 100, and the input part 300 may be installed on or in a surface or a front surface of the body 100.

The body 100 may be a system of an electronic device. The system may be constructed within the body 100. The system may be an electronic computing device. For example, the system may be a personal computer (PC). A display panel 210 may be provided in the display device 200 and display information to exterior.

Figure 2:
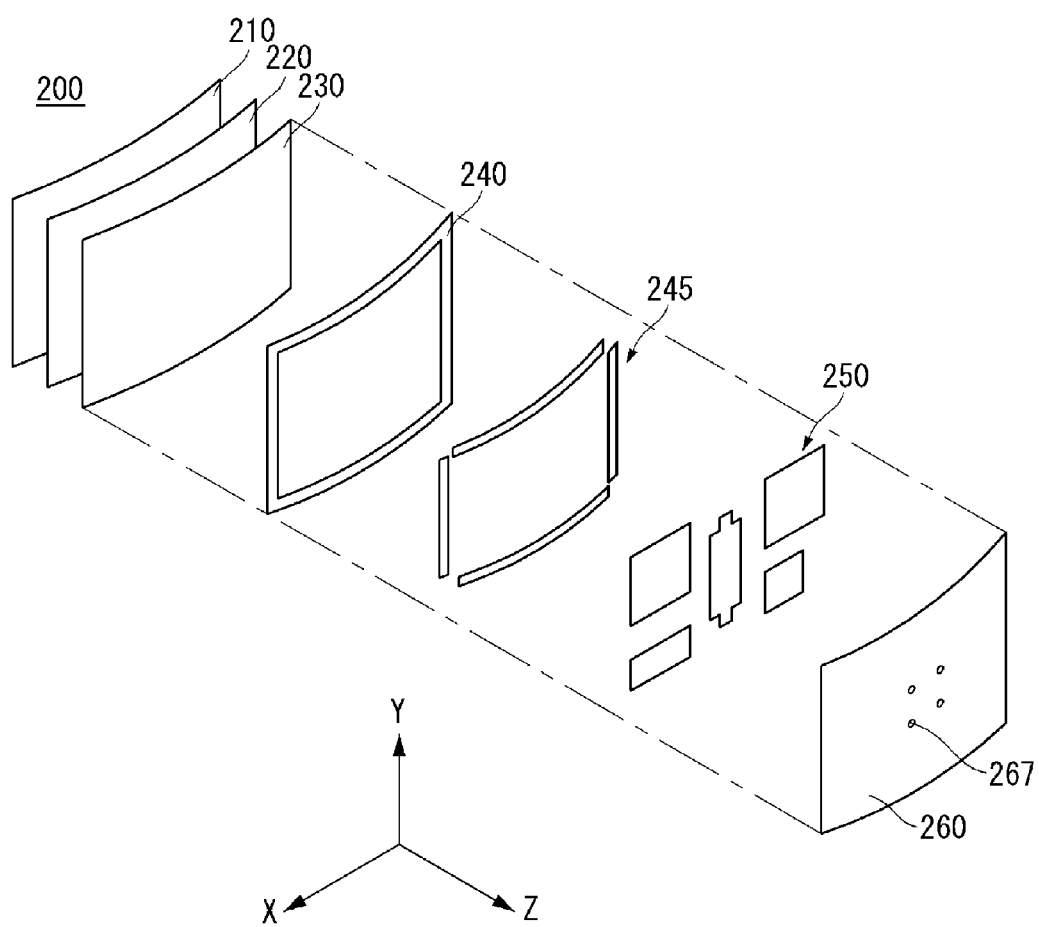

Referring to FIG. 2, the display panel 210 may display an image. The display panel 210 may include a plurality of layers. For example, the display panel 210 may include a front substrate and a rear substrate.

The display panel 210 may be a self-illuminating organic light-emitting diode (OLED or organic LED) panel. The OLED panel may not require a separate illumination for displaying an image. Accordingly, the OLED panel may be implemented with a relatively thin thickness and a flexible structure. For example, the OLED panel may implement the display panel 210 bent in a curvature or a plurality of curvatures.

A plate 220 may be attached to a rear surface of the display panel 210. The plate 220 and the display panel 210 may be coupled by an adhesive tape, or the like.

The plate 220 may be made of an aluminum material. The plate 220 made of aluminum may receive and distribute the heat generated in the display panel 210. Accordingly, the plate 220 may prevent congestion of heat in a specific area of the display panel 220, and thus, prevent deformation of the display panel 210 and maintain an image quality.

A module cover 230 may be attached to the plate 220. The module cover 230 and the plate 220 may be coupled by an adhesive tape, or the like. Accordingly, with the position of the plate 220 being center, the display panel 210 is attached to one surface thereof, and the module cover 230 may be attached to another surface thereof. A forming area may be disposed in the module cover 230. The forming area may be an area processed such that a predetermined area of the module cover 230 is stepped from the other areas. For example, a prominence and depression may be formed in the forming area by a press work. The heat generated from the display panel 210 may be dissipated to an exterior through the forming area.

An electronic component 250 may be coupled to the module cover 230. The electronic component 250 may generate a control signal required to operate the display device 200 including the display panel 210.

A frame 240 may be coupled to the display panel 210 and the module cover 230, which are coupled with the plate 220 being center. The frame 240 may include a material having rigidity of a predetermined degree or more and may provide rigidity to the display device 200.

A rigid bar 245 may be coupled to a rear surface of the module cover 230. The rigid bar 245 coupled with the module cover 230 may provide rigidity to the display device 200. The display device 200 having a relatively thin shape may be vulnerable to a force exerted from an exterior. The rigid bar 234 coupled to the module cover 230 in a horizontal and/or vertical direction may prevent the module cover 230 from being distorted.

A back cover 260 may cover a rear surface of the display device 200. The back cover 260 may include one or more air holes 267 and may be coupled to the frame 240.

Figure 3:
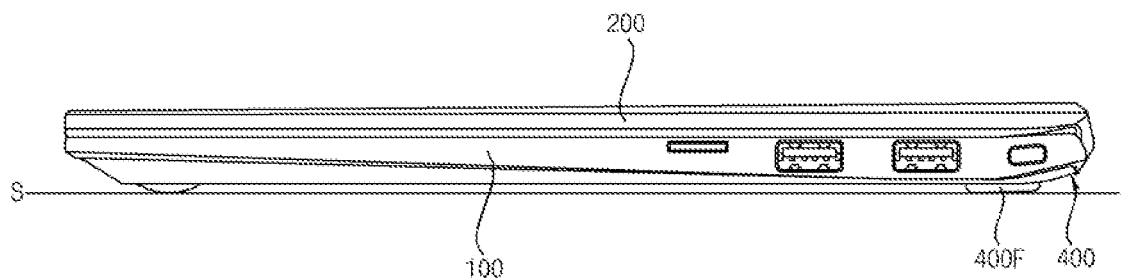
Figure 4:
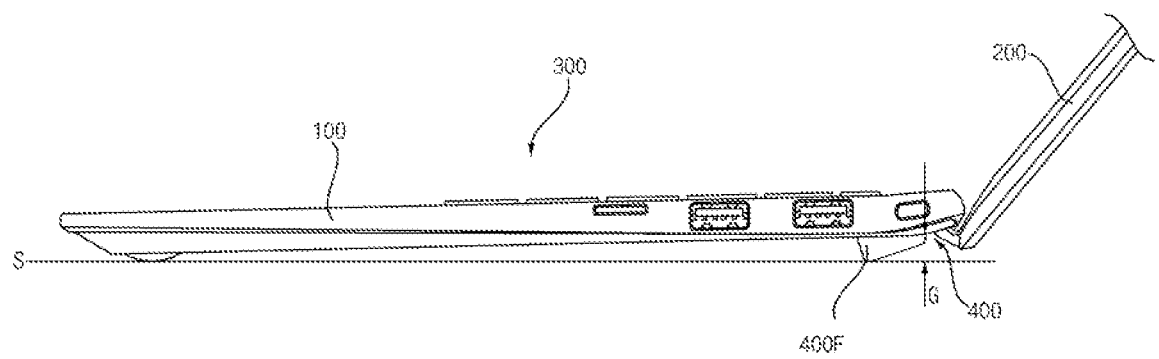

Referring to FIGS. 3 and 4, the display part 200 may be hinge-coupled to the body 100. The display part 200 may pivot on the body 100. The display part 200 may open or close a front surface of the body 100, and the input part 300 may be exposed to an exterior, and thus, a user may input computing data to a system. The display part 200 of which the display panel (210; refer to FIG. 2) is exposed may display the information computed in the system as an image.

The display part 200 may pivot on the hinge 400 and move in a direction of a supporting surface S. The hinge 400 may be adjacent to a rear side of the body 100 and may be coupled to the body 100 and the display part 200. For example, the hinge may include a first hinge adjacent to a left side of the body 100 and a second hinge adjacent to the right side of the body 100. While the display part 200 moves in a rear direction of the body 100, a space or a gap G may be formed between the rear surface of the body 100 and the supporting surface S adjacent to the portion in which the hinge 400 is located. A foot 400F of the hinge 400 may fill the gap G and move. The body may be cooled by the air passing through the gap G.

Figure 5:
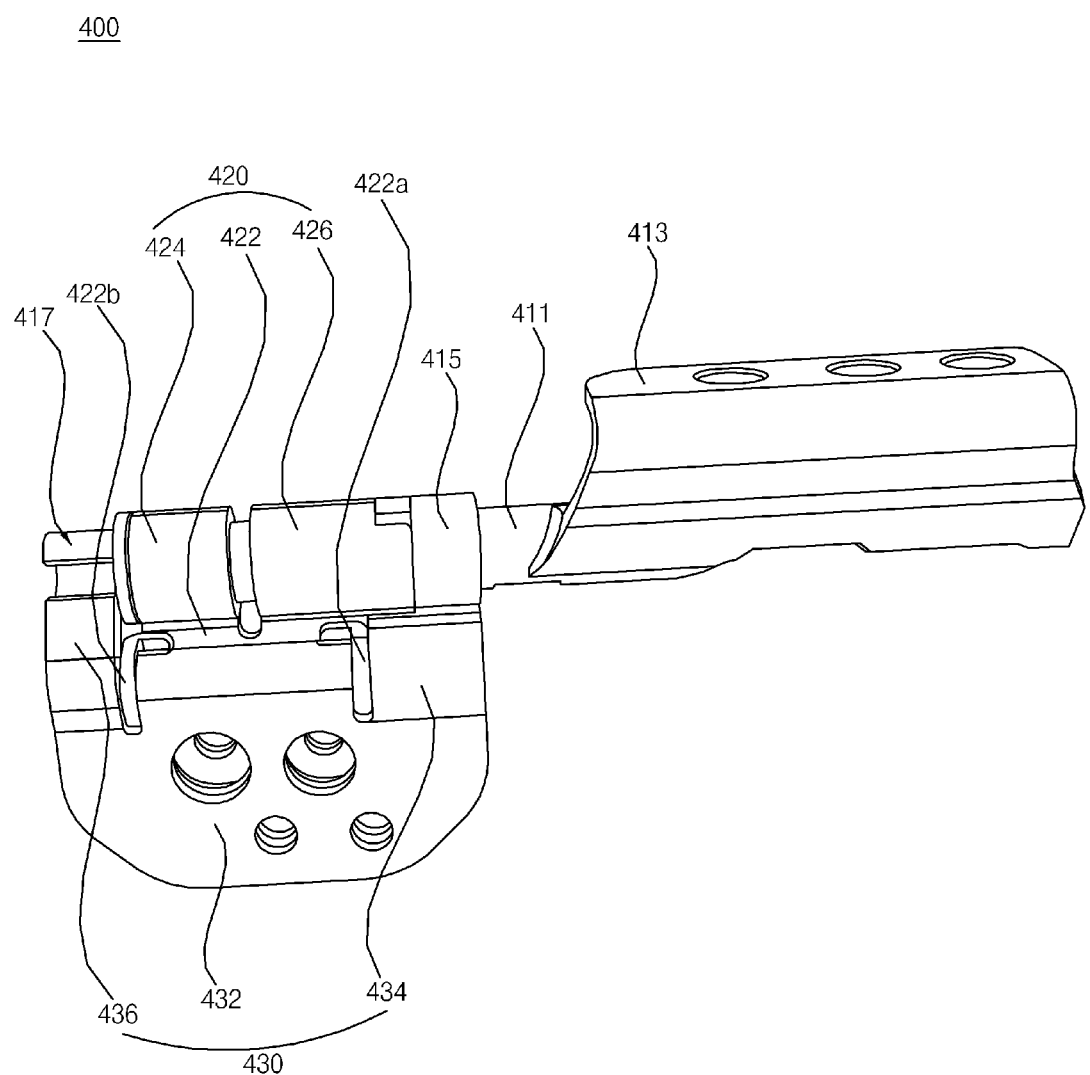
Figure 6:
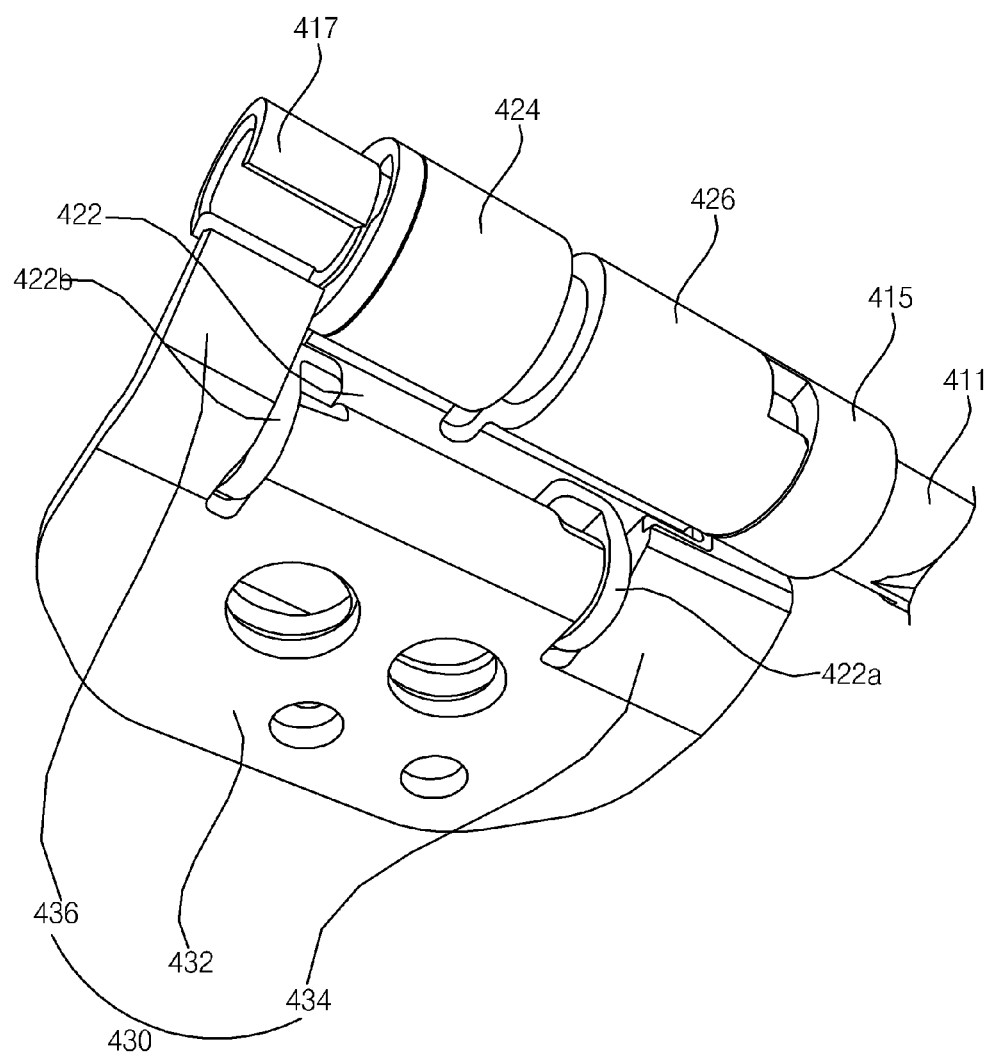

Referring to FIGS. 5 and 6, the hinge 400 may be referred to as a hinge assembly 400. A hinge shaft 411 may have a cylindrical shape which is elongated. The hinge shaft 411 may also have a rod shape which is elongated. A first coupling part 413 may be elongated in a diametral direction of the hinge shaft 411 from a part of the hinge shaft 411 which is adjacent to one end of the hinge shaft 411, and then, bent and elongated. The display part (200; refer to FIG. 4) may be fixed to the first coupling part 413. A first portion of the first coupling part 413 may extend from the hinge shaft 411 in a radial direction of the hinge shaft 411. A second portion of the first coupling part 413 may be curved toward the display part 200 from the first portion of the first coupling part 413. In this case, a lower side of the display part (200; refer to FIG. 4) may be hidden under the body 100 according to the rotation of the display part 200.

A recovery holder 417 may be formed at the other end of the hinge shaft 411. The recovery holder 417 may rotate together with the hinge shaft 411. The recovery holder 417 may have a cylindrical shape of which a part is open. For example, the recovery holder 417 may have "C" shape.

A cam 415 may be located between the recovery holder 417 and the first coupling part 413 and may be formed on an outer circumferential surface of the hinge shaft 411. The cam 415 may have an arc shape and may include one end and the other end which are spaced apart from each other. The cam 415 may rotate together with the hinge shaft 411.

A second coupling part 420 may be located between the recovery holder 417 and the cam 415. The second coupling part 420 may be provided with hinge holders 424 and 426 which surround the hinge shaft 411. The hinge holders 424 and 426 may surround the outer circumferential surface of the hinge shaft 411. The hinge holders 424 and 426 may rotate with respect to the hinge shaft 411. The hinge holders 424 and 426 may rotate with contacting or rubbing the outer circumferential surface of the hinge shaft 411. The second coupling part 420 may be provided with a coupling plate 422 extended in the diametral direction of the hinge shaft 411 from the hinge holders 424 and 426. The coupling plate 422 may be fixed to the body (100; refer to FIG. 4).

A foot plate 430 may be coupled to the coupling plate 420. The foot plate 430 may have a shape corresponding to the shape of the coupling plate 420. A Bracket 422*a* and 422*b* may be fixed to the coupling plate 420. The foot plate 430 may be pivotably coupled to the bracket 422*a* and 422*b*.

The foot plate 430 may include a foot coupling part 432, a cam tab 434, and a holder tab 436. The foot plate 430 may face the coupling plate 420 and may pivot with respect to the coupling plate 420. The foot coupling part 432 may be spaced apart from the hinge shaft 411 in the radial direction of the hinge shaft 411. The foot coupling part 432 may be positioned lower than the hinge shaft 411. The holder tab 436 may be extended from the foot coupling part 432 and may be inserted into the recovery holder 417 through the open surface of the recovery holder 417. The cam tab 434 may be extended from the foot coupling part 432 and may contact a portion of the cam 415 or may be spaced apart from the cam 415. The cam tab 434 may face the holder tab 436 with respect to the foot coupling part 432.

Figure 7:
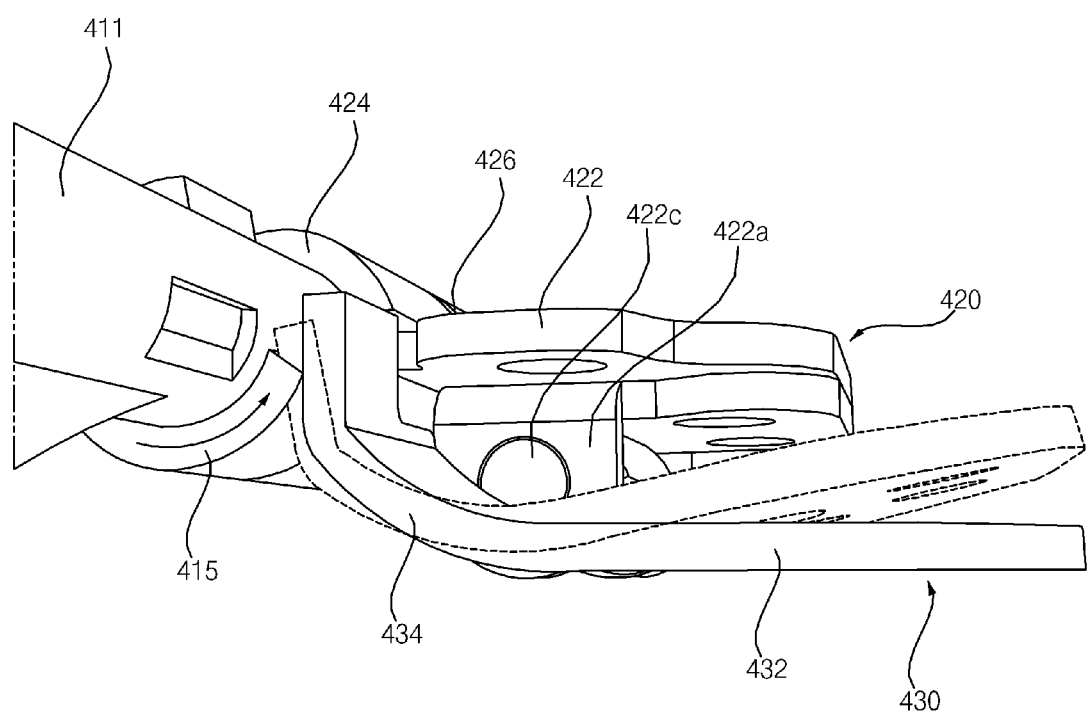

Referring to FIG. 7, when the hinge shaft 411 rotates with respect to the second coupling part 420, the cam 415 may rotate together with the hinge shaft 411. While the cam 415 rotates, the cam 415 may contact the cam tab 434. While the hinge shaft 411 rotates at a predetermined angle, the cam 415 may be spaced apart from the cam tab 434. When the hinge shaft 411 rotates at more than the predetermined angle, the cam 415 may contact the cam tab 434, and thus, the cam 415 may push the cam tab 434. The cam tab 434 may rotate the foot plate 430 with respect to an axis 422c of the brackets 422a and 422b by pushing the cam 415. In this case, the foot (400F, refer to FIG. 4) may proceed outside of the body 100. A side surface of the cam 415 may contact an outer surface of the cam tab 434 in a certain rotation range of the cam 415. Here, the outer surface of the cam tab 434 is a surface of the cam tab 434 facing the cam 415. In this case, in the above certain rotation range of the cam 415, a position of the foot 400F may be constant, and an angle of the body 100 with respect to the supporting surface (S; refer to FIG. 4) may be constant.

Figure 8:
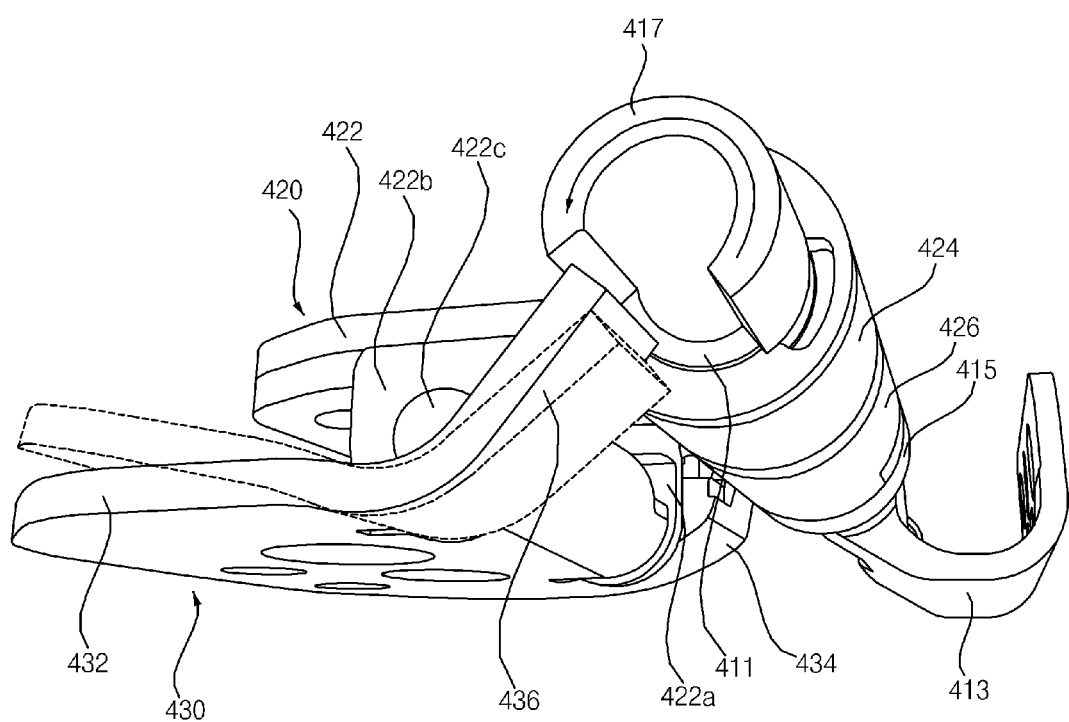
Figure 9:
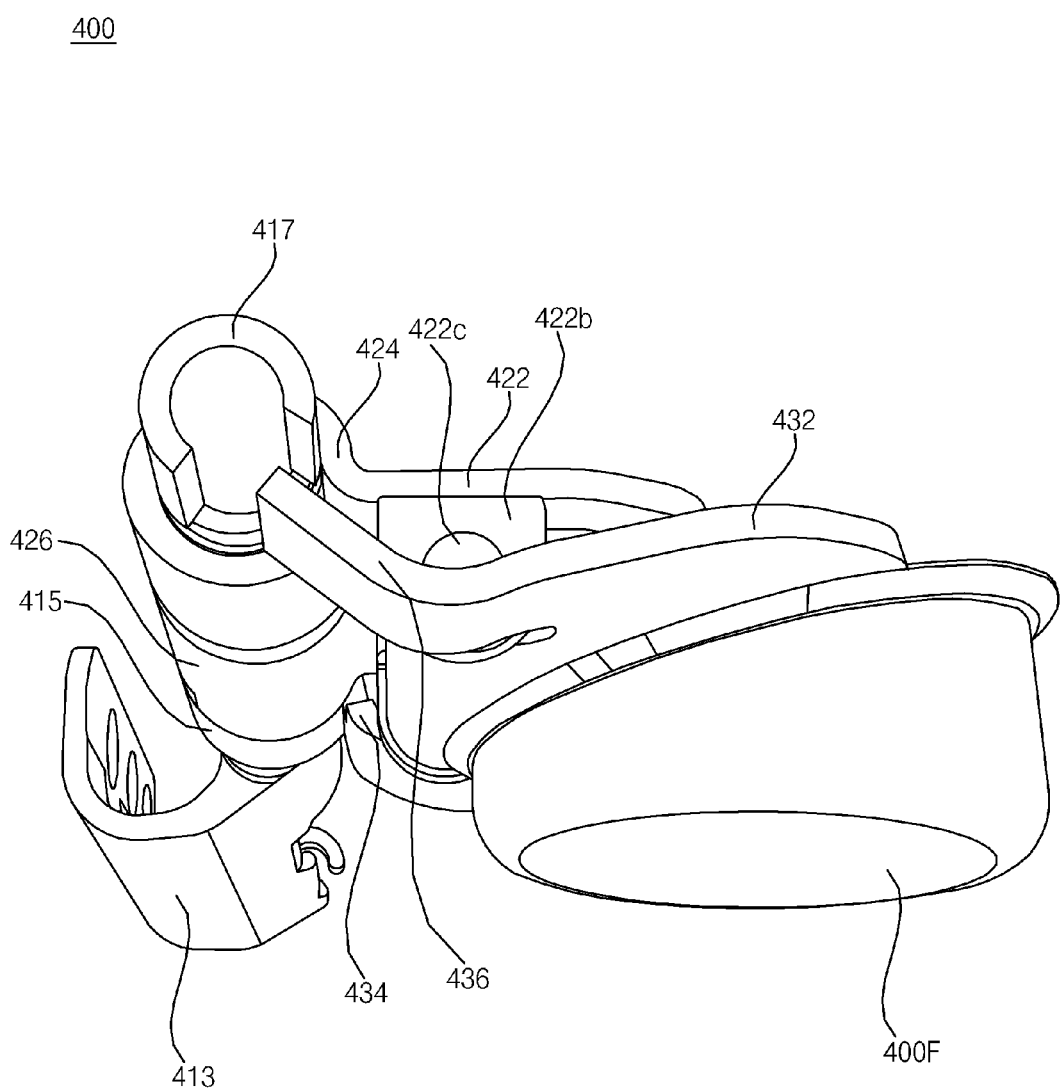

Referring to FIGS. 8 and 9, the foot 400F may be fixed on the foot coupling part 432. The foot 400F may have elastic force. For example, the foot 400F may include a rubber or other elastic material.

In the state that the foot (400F, refer to FIG. 4) moves forward to an exterior of the body 100 by the foot plate 430, the hinge shaft 411 may rotate in a reverse direction, and the recovery holder 417 may be spaced apart from the holder tab 436. In the case that the hinge shaft 411 further rotates in the reverse direction, the recovery holder 417 may contact the holder tab 436. In this case, an end of the holder tab 436 may be inserted into the recovery holder 417. The recovery holder 417 may push the holder tab 436. When the recovery holder 417 rotates and pushes the holder tab 436, the foot plate 430 may become close to the second coupling part 420. In this case, the foot (400F, refer to FIG. 4) may be accommodated into the body 100.

Referring to FIGS. 1 to 9, an electronic device according to an aspect of the present disclosure may include: a body provided with a computing system; a hinge assembly adjacent to one side of the body and installed inside of the body; and a display part including a display panel for displaying a screen, wherein the display part is pivotable with respect to the body and is connected to the hinge assembly, wherein the hinge assembly may include: a hinge shaft; a first coupling part adjacent to one end of the hinge shaft, extending from an outer circumferential surface of the hinge shaft, and fixed to the display part; a second coupling part rotatably coupled to the hinge shaft and that is fixed to the body; and a foot plate pivotably coupled to the second coupling part and pivotable with the second coupling part according to the rotation of the hinge shaft.

In another aspect of the present disclosure, the body may have an opening in a surface facing the foot plate, and the hinge assembly may include a foot fixed to the foot plate and that is located at the opening.

In another aspect of the present disclosure, the foot may have elastic force and may be movable into or out of the opening according to the pivoting of the foot plate.

In another aspect of the present disclosure, the hinge assembly may include a cam formed on the outer circumferential surface of the hinge shaft and that rotates together with the hinge shaft, and the foot plate may include a foot coupling part on which the foot is fixed and a cam tab extending from one side of the foot coupling part toward the cam and that contacts the cam or is spaced apart from the cam according to the rotation of the cam.

In another aspect of the present disclosure, the one side of the foot coupling part may be spaced apart from the hinge shaft in a radial direction of the hinge shaft, and the cam tab may be bent toward the cam from the one side of the foot coupling part.

In another aspect of the present disclosure, the cam may have an arc shape and may include one end and the other end which are spaced apart from each other, and the one end of the cam may be configured to approach an outer surface of the cam tab when the cam rotates in a first rotational direction and may move away from the outer surface of the cam tab when the cam rotates in a second rotational direction opposite the first rotational direction.

In another aspect of the present disclosure, a side surface of the cam may contact the outer surface of the cam tab in a certain rotation range of the cam.

In another aspect of the present disclosure, the hinge assembly may include a recovery holder formed on the outer circumferential surface of the hinge shaft and having a cylindrical shape of which a part is open, and the foot plate may include a foot coupling part to which the foot is coupled and a holder tab extending from one side of the foot coupling part toward the recovery holder and that contacts the recovery holder or is spaced apart from the recovery holder according to the rotation of the hinge shaft.

In another aspect of the present disclosure, the foot coupling part may be positioned lower than the hinge shaft, and the holder tab may extend in a direction crossing the hinge shaft and the foot coupling part.

In another aspect of the present disclosure, one end of the recovery holder may move away from an end of the holder tab when the hinge shaft rotates in a first rotational direction and may approach the end of the holder tab when the hinge shaft rotates in a second rotational direction opposite the first rotational direction.

In another aspect of the present disclosure, the foot plate, in a certain rotation range of the hinge shaft, may approach the second coupling part when the one end of the recovery holder pushes the end of the holder tab.

In another aspect of the present disclosure, the electronic device may further include a recovery holder formed at the other end of the hinge shaft and a cam formed on the outer circumferential surface of the hinge shaft and opposite the recovery holder with respect to the second coupling part, the recovery holder and the cam may rotate together with the hinge shaft, the foot plate may include: a foot coupling part on which the foot is fixed; a holder tab extending from one side of the foot coupling part toward the recovery holder and that contacts the recovery holder or is spaced apart from the recovery holder according to the rotation of the recovery holder; and a cam tab extending from the other side of the foot coupling part toward the cam and that contacts the cam or is spaced apart from the cam according to the rotation of the cam.

In another aspect of the present disclosure, the hinge assembly may further include a bracket fixed to the second coupling part, and the foot plate may be pivotably connected to the bracket.

In another aspect of the present disclosure, the second coupling part may include a hinge holder surrounding the hinge shaft and rotatably coupled to the hinge shaft and a coupling plate extending from the hinge holder in a radial direction of the hinge shaft and fixed to the body, the bracket may be fixed to the coupling plate, and the foot plate may be pivotably coupled to the bracket.

In another aspect of the present disclosure, the first coupling part may include a first portion extending from the hinge shaft in a radial direction of the hinge shaft and a second portion curved from the first portion toward the display part.

An electronic device according to another aspect of the present disclosure may include: a body provided with a computing system; a display part including a display panel for displaying a screen; and a means for hingeably connecting the display part to the body part, the means for hingeably connecting being adjacent to one side of the body and installed inside of the body.

A hinge assembly according to another aspect of the present disclosure is for connecting a display part of an electronic device to a body of the electronic device, and may include: a hinge shaft; a first coupling part adjacent to one end of the hinge shaft, extending from an outer circumferential surface of the hinge shaft, and fixed to the display part; a second coupling part rotatably coupled to the hinge shaft and that is fixed to the body; and a foot plate pivotably coupled to the second coupling part and that pivots with the second coupling part according to the rotation of the hinge shaft.

The effects of the electronic device according to the present disclosure will be described as follows.

According to at least one embodiment of the present disclosure, a hinge structure of an electronic device provided with a large screen display may be provided.

According to at least one embodiment of the present disclosure, an electronic device provided with a hinge structure to improve an immersive screen experience of a user may be provided.

According to at least one embodiment of the present disclosure, an electronic device provided with a hinge mechanism capable of an up-down drive may be provided.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in a specific embodiment and/or drawing and a configuration "B" described in another embodiment and/or the drawing may be combined with each other. In other words, although the combination between the configurations is not directly described, the combination is possible except in the case where it is described that the combination is impossible.

Although embodiments have been described with reference to the number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

Finally, the previously described hinge mechanism has been described as being useful for a PC like device. However, the invention is not limited thereto. That is, the previously described hinge mechanism may be applied to any device having a first part that is hingeably attached to a second part.

What is claimed is:

1. An electronic device comprising:
   a body provided with a computing system;
   a hinge assembly adjacent to one side of the body and installed inside of the body; and
   a display part including a display panel for displaying a screen, wherein the display part is pivotable with respect to the body and is connected to the hinge assembly,
   wherein the hinge assembly comprises:
   a hinge shaft;
   a first coupling part adjacent to one end of the hinge shaft, extending from an outer circumferential surface of the hinge shaft, and fixed to the display part;
   a second coupling part rotatably coupled to the hinge shaft and that is fixed to the body; and
   a foot plate pivotably coupled to the second coupling part and that is pivotable with the second coupling part according to the rotation of the hinge shaft.

2. The electronic device of claim 1, wherein the body has an opening in a surface of the body facing the foot plate, and
   wherein the hinge assembly comprises a foot fixed to the foot plate and that is located at the opening.

3. The electronic device of claim 2, wherein the foot has elastic force and is moveable into or out of the opening according to the pivoting of the foot plate.

4. The electronic device of claim 2, wherein the hinge assembly comprises a cam formed on the outer circumferential surface of the hinge shaft and that rotates together with the hinge shaft, and
   wherein the foot plate comprises:
   a foot coupling part on which the foot is fixed; and
   a cam tab extending from one side of the foot coupling part toward the cam and that contacts the cam or is spaced apart from the cam according to the rotation of the cam.

5. The electronic device of claim 4, wherein the one side of the foot coupling part is spaced apart from the hinge shaft in a radial direction of the hinge shaft, and
   wherein the cam tab is bent toward the cam from the one side of the foot coupling part.

6. The electronic device of claim 5, wherein the cam has an arc shape and includes one end and the other end which are spaced apart from each other, and
   wherein the one end of the cam is configured to approach an outer surface of the cam tab when the cam rotates in a first rotational direction and move away from the outer surface of the cam tab when the cam rotates in a second rotational direction opposite the first rotational direction.

7. The electronic device of claim 6, wherein a side surface of the cam contacts the outer surface of the cam tab in a certain rotation range of the cam.

8. The electronic device of claim 2, wherein the hinge assembly comprises a recovery holder formed on the outer circumferential surface of the hinge shaft and having a cylindrical shape of which a part is open, and
   wherein the foot plate comprises:
   a foot coupling part to which the foot is coupled; and
   a holder tab extending from one side of the foot coupling part toward the recovery holder and that contacts the recovery holder or is spaced apart from the recovery holder according to the rotation of the hinge shaft.

9. The electronic device of claim 8, wherein the foot coupling part is positioned lower than the hinge shaft, and
   wherein the holder tab extends in a direction crossing the hinge shaft and the foot coupling part.

10. The electronic device of claim 9, wherein one end of the recovery holder moves away from an end of the holder tab when the hinge shaft rotates in a first rotational direction and approaches the end of the holder tab when the hinge shaft rotates in a second rotational direction opposite the first rotational direction.

11. The electronic device of claim 10, wherein the foot plate, in a certain rotation range of the hinge shaft, approaches the second coupling part when the one end of the recovery holder pushes the end of the holder tab.

12. The electronic device of claim 2, further comprising:
- a recovery holder formed at the other end of the hinge shaft; and
- a cam formed on the outer circumferential surface of the hinge shaft and opposite the recovery holder with respect to the second coupling part,
- wherein the recovery holder and the cam rotate together with the hinge shaft,
- wherein the foot plate comprises:
- a foot coupling part on which the foot is fixed;
- a holder tab extending from one side of the foot coupling part toward the recovery holder and that contacts the recovery holder or is spaced apart from the recovery holder according to the rotation of the recovery holder; and
- a cam tab extending from the other side of the foot coupling part toward the cam and that contacts the cam or is spaced apart from the cam according to the rotation of the cam.

13. The electronic device of claim 1, wherein the hinge assembly further comprises a bracket fixed to the second coupling part, and wherein the foot plate is pivotably connected to the bracket.

14. The electronic device of claim 13, wherein the second coupling part further comprises:
- a hinge holder surrounding the hinge shaft and rotatably coupled to the hinge shaft; and
- a coupling plate extending from the hinge holder in a radial direction of the hinge shaft and fixed to the body,
- wherein the bracket is fixed to the coupling plate, and
- wherein the foot plate is pivotably coupled to the bracket.

15. The electronic device of claim 1, wherein the first coupling part comprises:
- a first portion extending from the hinge shaft in a radial direction of the hinge shaft; and
- a second portion curved from the first portion toward the display part.

16. A hinge assembly for connecting a display part of an electronic device to a body of the electronic device, wherein the hinge assembly comprises:
- a hinge shaft;
- a first coupling part adjacent to one end of the hinge shaft, extending from an outer circumferential surface of the hinge shaft, and fixed to the display part;
- a second coupling part rotatably coupled to the hinge shaft and that is fixed to the body; and
- a foot plate pivotably coupled to the second coupling part and that pivots with the second coupling part according to the rotation of the hinge shaft.

* * * * *